United States Patent

Cassidy et al.

[11] Patent Number: 5,583,689
[45] Date of Patent: Dec. 10, 1996

[54] FILTER WITH PRESELECTED ATTENUATION/WAVELENGTH CHARACTERISTIC

[75] Inventors: Stephen Cassidy; Richard Wyatt; Raman Kashyap; Jonathan R. Armitage; Robert Campbell, all of Suffolk, United Kingdom

[73] Assignee: British Telecommunications public limited company

[21] Appl. No.: 347,298
[22] PCT Filed: Jun. 1, 1993
[86] PCT No.: PCT/GB93/01160
§ 371 Date: Feb. 8, 1995
§ 102(e) Date: Feb. 8, 1995
[87] PCT Pub. No.: WO93/24977
PCT Pub. Date: Dec. 9, 1993

[30] Foreign Application Priority Data

Jun. 1, 1992 [EP] European Pat. Off. ............. 92304983

[51] Int. Cl.$^6$ ................. H01S 3/00; G02B 27/00
[52] U.S. Cl. ............. 359/341; 359/577; 359/568
[58] Field of Search ................. 359/341, 577, 359/589, 568

[56] References Cited

U.S. PATENT DOCUMENTS

| | | |
|---|---|---|
| H474 | 6/1988 | Taylor . |
| 3,809,455 | 5/1974 | Pekau et al. . |
| 4,474,427 | 10/1984 | Hill et al. . |
| 4,636,031 | 1/1987 | Schmadel, Jr. et al. . |
| 4,792,197 | 12/1988 | Inoue et al. ............. 350/317 |
| 5,065,071 | 11/1991 | Donofrio et al. . |
| 5,238,785 | 8/1993 | Ohkura et al. ............. 430/321 |
| 5,260,823 | 11/1993 | Payne et al. ............. 359/341 |
| 5,271,024 | 12/1993 | Huber ............. 372/6 |
| 5,436,760 | 7/1995 | Nakabayashi ............. 359/341 |
| 5,455,710 | 10/1995 | Takeda ............. 359/341 |

OTHER PUBLICATIONS

Patent Abstracts of Japan, vol. 9, No. 30 (P-333) 8 Feb. 1985 & JP A 59172609 (Canon KK).
Giles et al, "Dynamic Gain Equalization in Two-Stage Fiber Amplifiers", IEEE Photonics Technology Letters, vol. 2, No. 12, Dec. 1990, New York US pp. 86866–86868.
Tachibana et al, "Erbium-Doped Fiber Amplifier With Flattened Gain Spectrum", IEEE Photonics Technology Letters, vol. 3, No. 2, Feb. 1991, pp. 118–121.
Sorin et al, "A Single-Mode Fiber Evanescent Grating Reflector", Journal of Lightwave Technology, vol. LT-3, No. 5, Oct. 1985, pp. 1041–1043.
"All-Fibre Narrowband Reflection Gratings at 1500 nm", Electronics Letters, 24th May 1990, vol. 26, No. 11, pp. 730–732.
Ball et al, "Efficient Integrated Nd$^{3+}$ Fiber Laser", IEEE Transactions Photonics Technology Letters, vol. 3, No. 12, Dec. 1991, pp. 1077–1072.

(List continued on next page.)

*Primary Examiner*—Mark Hellner
*Attorney, Agent, or Firm*—Nixon & Vanderhye P.C.

[57] ABSTRACT

A filter has a preselected attenuation/wavelength characteristic, in which spatially separated parts of the filter attenuate different wavelengths. The spatially-separated parts have different attenuation characteristics to attenuate different wavelengths in a predetermined manner to provide a selected attenuation/wavelength characteristic. In one arrangement an interference type filter includes a grating, the pitch of which varies spatially. In one instance, the structure to determine the proportion of radiation subject to interference includes a grating of spatially-varying effectiveness, but alternatively it may include an attenuation filter, the attenuation effect of the attenuation layer varying spatially. In another arrangement, the filter may include structure to separate received radiation into a spatially-disposed spectrum, and to attenuate different parts of the spatially-disposed spectrum in such a manner as to provide the selected attenuation/wavelength characteristic.

31 Claims, 13 Drawing Sheets

OTHER PUBLICATIONS

Giesler et al, "Instrumentation Concepts for Multiplexed Bragg Grating Sensors", SPIE, vol. 1480, Sensors and Sensor Integration (1991), pp. 138–142.

Ball et al, "Continuously Tunable Single–Mode Erbium Fiber Laser", Optics Letters, vol. 17, No. 6, Mar. 15, 1992, pp. 420–422.

Kersey et al, "High–Resolution Fibre–Grating Based Strain Sensor with Interferometric Wavelength–Shift Detection", Electronics Letters, 30 Jan. 1992, voll 28, No. 3, pp. 236–238.

"Phase–Shifted Moire Grating Fibre Resonators", Electronics Letters, 4 Jan. 1990, pp. 10–11, vol. 26, No. 1.

"Formation of Moire Grating in Core of Germanosilicate Fibre by Transverse Holographic Double Exposure Method", Electronics Letters, 10 Oct. 1991, vol. 27, No. 21, pp. 1945–1947.

"$Nd^{3+}$ Laser Utilising Infra–Core Bragg Reflectors", Electronics Letters, 11 Oct. 1990, vol. 26, No. 21, pp. 1829–1830.

Two Inspec Searches for papers by W W Morey from 1990 on "Filters".

FILTER WITH PRESELECTED ATTENUATION/WAVELENGTH CHARACTERISTIC

BACKGROUND OF THE INVENTION

1. Field of the Invention

The present invention relates to a filter with a selected attenuation/wavelength characteristic, and a method for making the same.

2. Related Art

It is known that the erbium (or other rare earth) doped fibre amplifiers or other types of fibre amplifiers are very attractive devices for optical communications and are likely to become widely used in place of optoelectronic repeaters. However, as it is generally desirable to multiplex signals by means of wavelength division multiplexing (WDM), the gain spectrum of an erbium doped fibre amplifier (simplified in FIG. 1) is not ideal having one large peak A and a (usually) lower peak B and a flatter spectrum over the desired range R, as shown in FIG. 2, would be desirable, especially where a series of amplifiers are used, to avoid large differences in gain across the wavelength band. Thus if the different signals which are to be multiplexed are provided at wavelengths $\lambda_1, \lambda_2 \ldots \lambda_5$ as shown in FIG. 1, the signal at wavelength $\lambda_2$ will be amplified considerably greater than the signals at wavelength $\lambda_1$ and $\lambda_3$ or $\lambda_5$ and the signal at wavelength $\lambda_4$ will be amplified to a slightly less extent than $\lambda_2$. This clearly creates problems particularly if the WDM signal is passed through several erbium doped fibre amplifiers. One method of obtaining a flatter gain spectrum is to introduce a filter into the system with a selected attenuation/wavelength characteristic to compensate for the variation of the spectrum from a preferred flat spectrum.

It will be understood, in addition to the peaks A and B the erbium spectrum includes fine detail (not shown). It is possible to eliminate peak A by means of a filter such as a known interference filter (eg: grating filter) with an attenuation characteristic shown in FIG. 3 having a maximum attenuation at C at the interference wavelength and an attenuation peak D at lower wavelengths by matching peak D with peak A. Such an arrangement is described in an article entitled "D-Fibre Filter for Erbium Gain Spectrum Flattening" (Electronics Letters, 16 Jan. 1992 Vol 28, No 2, page 131–132). Such a filter can improve the flatness of the gain spectrum to within 0.5 dB over a 30 nm span. FIG. 4 shows the erbium gain spectrum after passing through the filter with the characteristic of FIG. 3. Nevertheless, peak B of the amplifier gain spectrum remains, and indeed this feature can be accentuated when the signal is passed through a succession of erbium doped fibre amplifiers with such filters.

It will be understood that a filter for use with an erbium or other rare earth doped fibre amplifier should not be a reflection type filter since this will create problems with the amplifier. A preferred type of filter is an interference filter, and we will describe a variety of filters including Bragg side-tap gratings.

In this specification the term "optical" is intended to refer to that part of the electromagnetic spectrum which is generally known as the visible region together with those parts of the infra-red and ultraviolet regions at each end of the visible region which are capable, for example, of being transmitted by dielectric optical waveguides such as optical fibres.

SUMMARY OF THE INVENTION

The present invention provides, according to a first aspect, a filter with a selected attenuation/wavelength characteristic over a range of wavelengths in which the filter extends in a generally linear manner, the filter being adapted so that the wavelength of radiation which the filter attenuates varies continuously from a first part of the filter which attenuates a first wavelength to a second part, spaced from the first part, which attenuates a second wavelength, the first and second wavelengths defining the range of wavelengths, the filter being arranged so that the degree of attenuation varies in a selected manner from said first part to said second part to provide said attenuation/wavelength characteristic.

In the arrangement to be described, the filter may be provided with a preselected attenuation/wavelength characteristic to match the spectrum of an amplifier such as an erbium doped fibre amplifier but the preselected attenuation/wavelength characteristic may be chosen according to the circumstances of the filters. For example, a filter with a different preselected attenuation/wavelength characteristic may be provided to attenuate a different spectrum or indeed may be arranged to provide a particular desired spectrum in response to a flatter input wavelength spectrum.

The filter is preferably an interference type filter, the dimensions of interference means of said interference filter providing the interference and defining the wavelength varying in a continuous manner across the filter between said two parts, and attenuation means is spaced in a continuous manner across said filter to determine the proportion of radiation subject to interference at each point across filter.

In one arrangement said interference type filter includes a grating, the pitch of which varies spatially.

In one instance, the attenuation means comprises a grating of spatially-varying effectiveness, but alternatively the attenuation means may comprise an attenuation filter, the attenuation effect of the attenuation layer varying spatially.

In another arrangement, said filter may include means to separate received radiation into a spatially-disposed spectrum, and means is provided to attenuate different parts of the spatially-disposed spectrum in such a manner as to provide said selected attenuation/wavelength characteristic.

The present invention also provides a method for producing a filter comprising passing to a radiation transmitting material with defect states two beams of radiation of a wavelength which change the density of defect states, said radiation being provided in the form of two beams which provide an interference pattern on said material, one of the beams being divergent or convergent with respect to the other beam whereby to provide an interference grating pattern of density of defect states with spatially varying pitch, and further modifying the density pattern of defect states spatially across the interference pattern either as the interference pattern is produced or thereafter to provide a filter as aforesaid.

The present invention also provides a filter with a preselected attenuation/wavelength characteristic, in which spatially separated parts of the filter attenuate different wavelengths, said spatially-separated parts having different attenuation characteristics whereby to attenuate different wavelengths in a predetermined manner to provide a selected attenuation/wavelength characteristic.

Preferably the filter comprises a plurality of side-tap Bragg gratings in a length of optical fibre. The advantage of such an arrangement is that the radiation is not reflected back along the optical fibre and the filter may be used with a erbium or other rare-earth doped fibre amplifier.

BRIEF DESCRIPTION OF THE DRAWINGS

Preferred embodiments of the invention will now be described by way of example only with reference to the accompanying drawings in which.

DETAILED DESCRIPTION OF EXEMPLARY EMBODIMENTS

Figure 6:
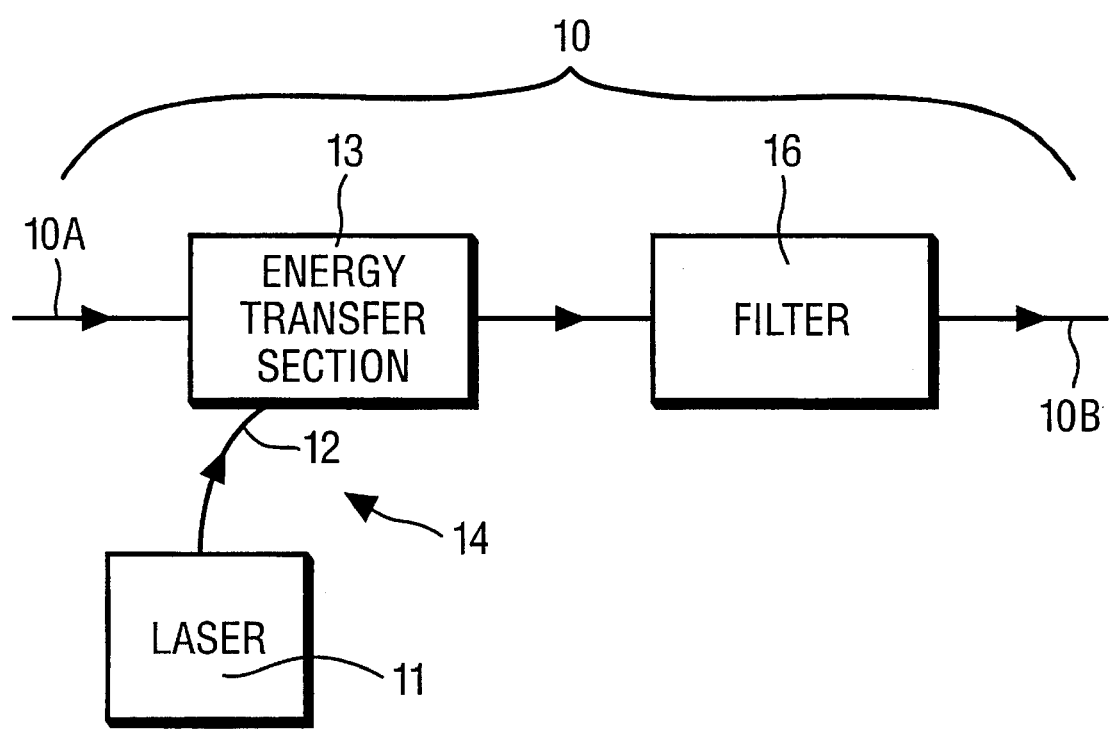

Referring to FIG. 6, there is shown a mono mode optical fibre 10 for receiving input signals at input 10A and passing them to output 10B. As described above, the input signal passed to the input 10A may comprise a wavelength division multiplexed signal, each separate signal carrying, for example, a separate telephone channel. An erbium doped fibre amplifier 14 is provided comprising a semiconductor laser 11 which provides pumping radiation of for example 0.98 micron or 1.48 micron along a fibre 12 to an energy transfer section 13 of the fibre 10. There is also provided a filter 16 at the output of the amplifier 14 which provides a selected attenuation/wavelength characteristic.

Figure 1:
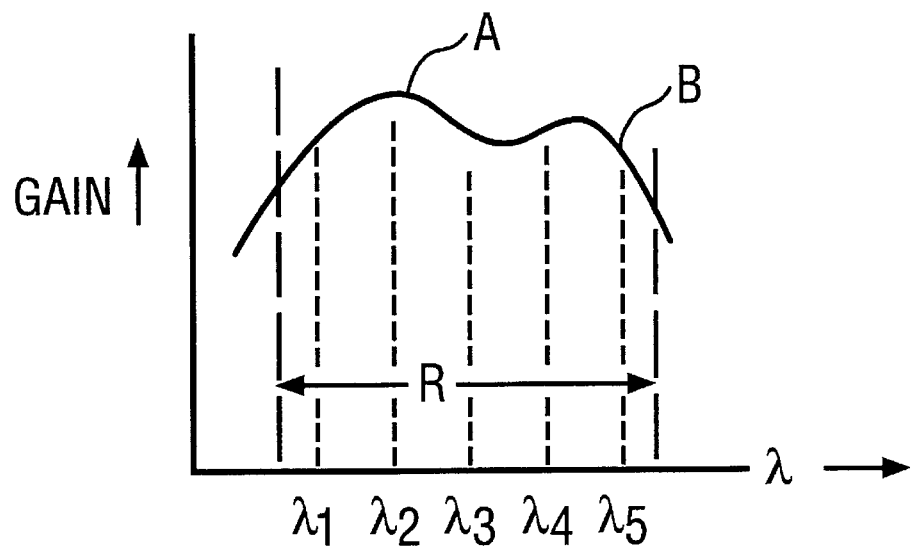
FIG. 1, already described, shows, in diagrammatic form, the gain spectrum of an erbium doped fiber amplifier, FIG. 2, already described, shows, in diagrammatic form, the desired gain spectrum of an erbium doped fibre amplifier with filter, FIG. 3, already described, shows, in diagrammatic form, an attenuation/wavelength characteristic of a known interference filter, FIG. 4, already described, shows, in diagrammatic form, the gain spectrum of an erbium doped fibre amplifier after passing through a filter with characteristics shown in FIG. 3, FIG. 5, shows, in diagrammatic form, a desired attenuation/wavelength characteristic of a filter according to the invention, FIG. 6 sets out diagrammatically the arrangement of amplifier and filter for use in an optical fibre.
Figure 2:
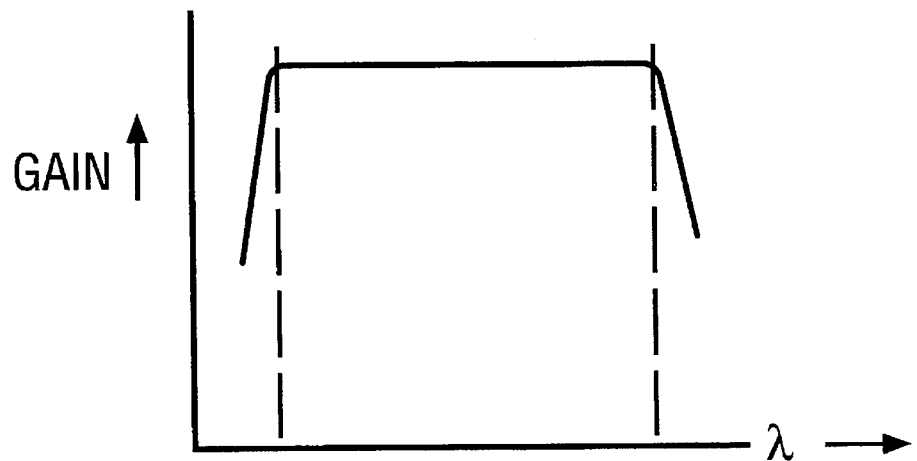

As has already been described with reference to FIG. 1, the erbium doped fibre amplifier 14 is arranged to amplify input data signals provided at the input 10A of the fibre 10, the arrangement being such that multiplexed input data signals are provided at the input 10A, in a wavelength range R which can be amplified by the amplifier 14. The gain spectrum of the amplifier is shown in FIG. 1 and it will be seen that those multiplex signals of a wavelength $\lambda_2$ or $\lambda_4$ adjacent the large peak A or the lower peak B will be preferentially amplified and it is therefore desirable to provide a filter which, in combination with the fibre amplifier 14, provides an overall amplification which is substantially flat across the waveband being used as shown in FIG. 2.

The arrangement of the erbium doped fibre amplifier 14 is well known and will not be described further.

The preferred embodiments of the invention will relate in this case to the filter 16 which is provided with selected attenuation/wavelength characteristics which compensate for the amplifier gain spectrum.

Figure 3:
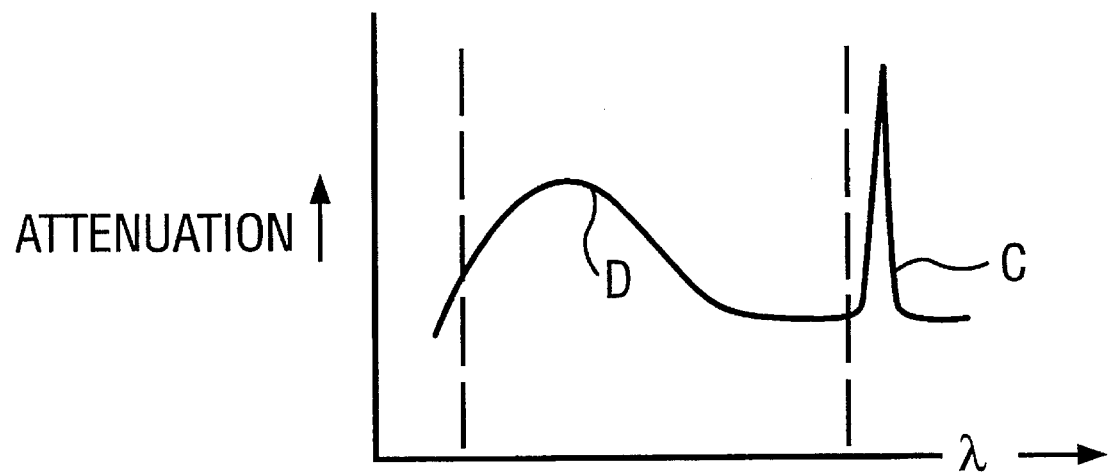
Figure 4:
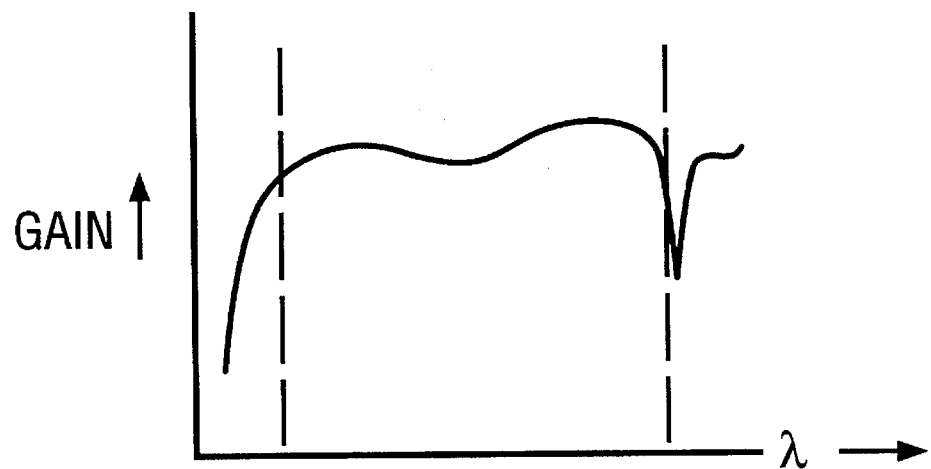

Fibre grating devices for use as reflection filters have previously been proposed. A grating is provided on the inner core of the optical fibre by utilising a D fibre section and providing, for example, transverse slots which act as an interference grating. Such a grating has a predetermined pitch distance between the slots which is chosen so as to provide an interference attenuation characteristic of FIG. 3 which eliminates, for example, the peak A in the erbium doped fibre amplifier gain characteristic as shown in FIG. 4.

In the present arrangements of the invention to be described with reference to FIGS. 6–9, there is provided a grating in which the pitch varies along the grating so as to provide a grating which will provide interference with radiation of a range of values of wavelength. Whilst a slot type grating of the type described in the preceding paragraph may be provided with a pitch which varies along the grating, in practice we prefer to provide an alternative form of grating which can be more simply manufactured.

Figure 7:
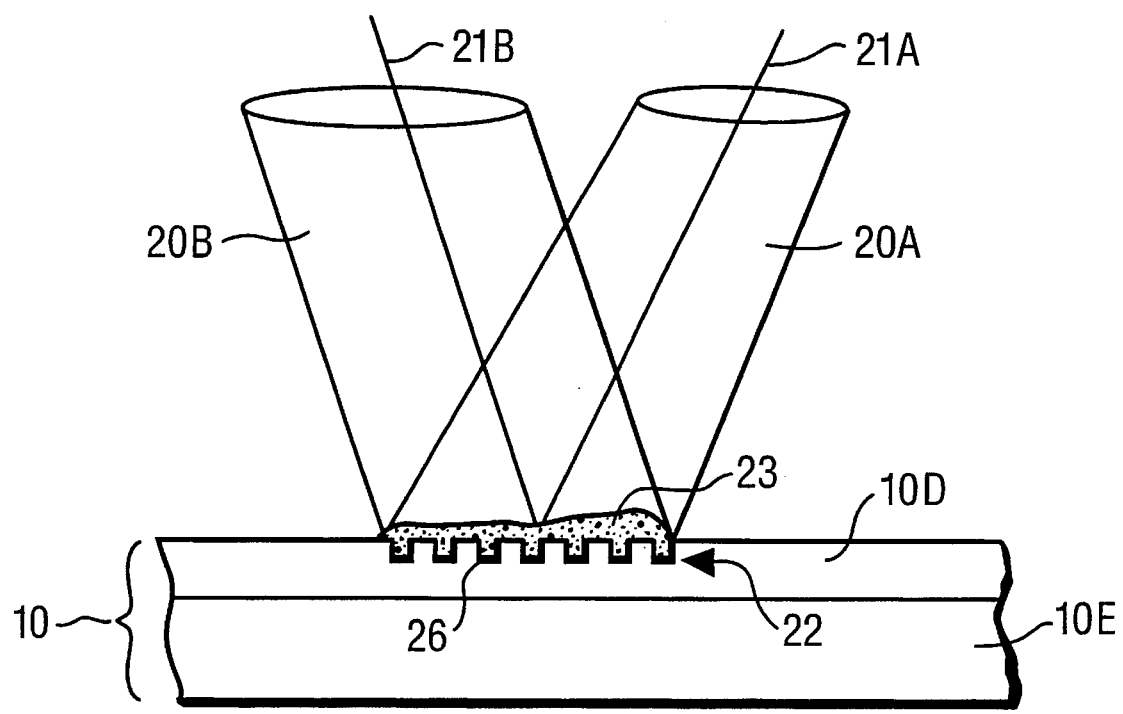
FIG. 7 shows an axial section of "D" fibre illustrating diagrammatically a first method for producing a grating type filter of the invention.

FIG. 7 shows an arrangement for producing a grating of variable pitch. The fibre 10 which, as is well known comprises an core 10D of, for example, silicon dioxide ($SiO_2$) doped with germanium dioxide ($GeO_2$) surrounded by an outer cladding 10E of $SiO_2$, and in the area of the grating, the fibre is cut or ground away to a semicircular section to provide a "D" cross section fibre. Within the core 10D, the germanium dioxide includes defect states. These defect states affect the optical characteristics of the core. Illumination of the core 10D by means of radiation of a wavelength of about 240 nm changes the state of these defects and thereby changes the effective refractive index of the inner core. Referring to FIG. 7 it will be seen that the core 10D of the fibre 10 is illuminated by two beams of radiation 20A, 20B of 240 nm wavelength, the two beams 20A, 20B being passed to the core 10D on respective optical axes 21A, 21B at an angle to one another whereby an interference pattern 22 is formed on the core 10D. It will also be noted that one of the beams 20A, is arranged to be divergent and as a result an interference pattern 22 of variable pitch is provided. A typical pitch for a 1.5 μm reflecting grating would be, say, 0.4 to 0.7 μm, say 0.53 μm. With a 240 nm beam this corresponds to a 14 degree half-angle between the interfering beams, and a typical divergence angle would be 1 degree. Note that both beams could be diverging, rather than just one. The variation in pitch required scales directly with the spread required in the wavelength, 5% pitch variation for 5% wavelength spread.

Figure 8:
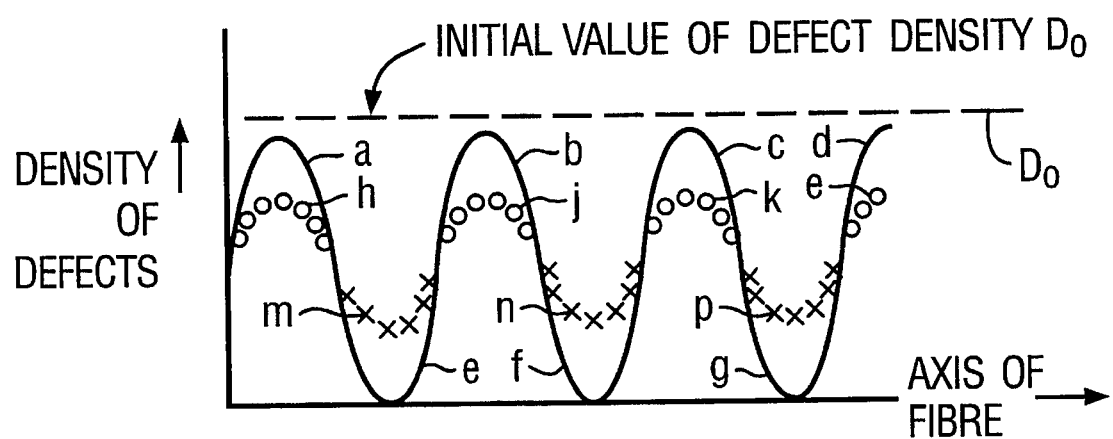
FIG. 8 is a diagrammatic graph of the density of $GeO_2$ defects along the axis of the grating formed by the method of FIG. 7.

It will be understood that the interference pattern 22 of radiation (of 240 nm) produced, which is of grating form, will produce a corresponding grating type pattern in the density of the germanium oxide defect states. FIG. 8 illustrates in exaggerated form the density of defects along the axis of the grating 22. As thus far described, with the two beams 20A and 20B being passed to the core 10D, the density of defects will be sinusoidal but with increasing pitch, as illustrated by the solid line in FIG. 8, sections a,e,b,f,c,g,d. In this way there is provided, effectively, on optical grating which will provide an interference optical effect for the radiation passing along the core 10D which exactly mirrors the interference pattern 22 produced by the beams 20A, 20B.

By selecting the relative angles between the two beams 20A, 20B, we can provide an interference pattern 22 of a desired basic pitch and by selecting the angle of divergence of the beam 20A, we can selectively vary the pitch along the grating.

As a result, there is provided an interference filter which provides interference with a selected range of wavelength values of radiation passing along the core 10D, and we select the range of wavelength values to match the range of WDM signals to be used, ie, a range of at least $\lambda_1-\lambda_5$ this range being indicated as R in FIG. 1.

It is also desired to provide a variable degree of interference effect at different wavelengths across the range R of wavelengths and this can be provided during manufacture in two ways. In the first arrangement, there may be provided as shown in FIG. 7 an attenuating layer 23 which may be of any material which attenuates the 240 nm radiation in the beams 20A, 20B, the thickness of the attenuating layer 23 being arranged spatially with respect to the grating so as to provide a desired attenuation effect along the length where the grating is to be formed, to thereby vary the effectiveness of the interference of the grating as desired. In an alternative arrangement, the layer 23 instead of being of variable thickness, may be of variable density (which may be provided photographically, for example).

The net effect of the attenuating layer 23 (assuming for the moment that it is an equal thickness along the ridge illustrated in FIG. 7) is to reduce the effect of the radiation in reducing the number of defect states and so the density of defects will follow parts a,m,b,n,c,p,d in the graph of FIG. 8. In other words, the depletion of the density of the defect states will be reduced. In practice, as the thickness of the layer 23 varies across the grating, the minimum value of density of defects will vary towards zero where the layer 23 is thinnest to a value close to the initial value $D_o$ where the layer 23 is thickest.

Figure 5:
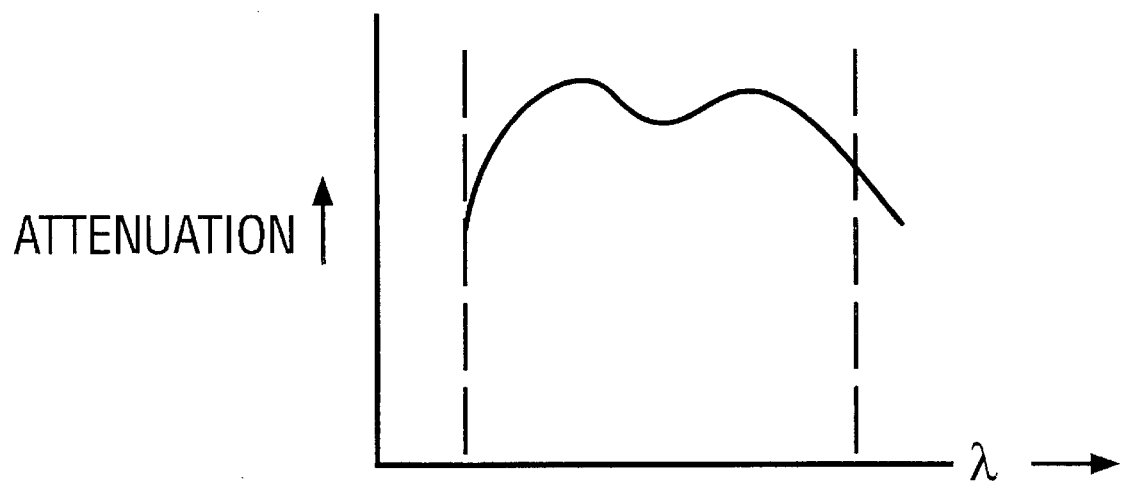

In this way, there is provided a grating 26 in the core 10D which may be arranged to interfere with a range R of wavelengths of radiation passing along the core 10D, different parts of the grating interfering with different wavelengths, and the interference effect may be varied at different wavelengths by selectively varying the extent of interference effect at different spatial parts of the grating to provide a desired attenuation/wavelength characteristic. In a preferred arrangement, the characteristic provided may be as shown in FIG. 5. In this way, the output of an erbium doped fibre amplifier can be provided which is substantially flat across a range of wavelength values as shown in FIG. 2. It should be understood that the filter may be arranged not only to eliminate the peaks A and B of the amplifier gain spectrum but also the fine detail not shown in FIGS. 1–5.

Figure 9:
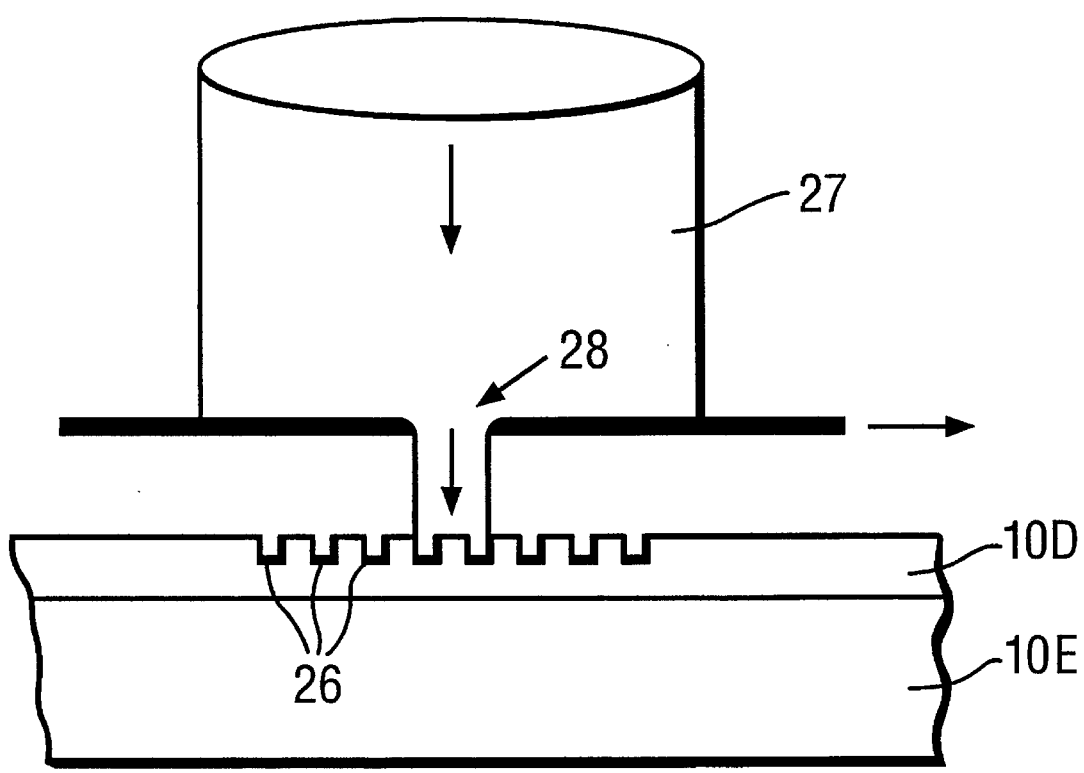
FIG. 9 shows a second method for manufacturing a grating filter of the invention.

In an alternative, the variable pitch grating may be provided as shown in FIG. 7 but without the attenuating layer 23. In order to provide the variable interference effect across the grating and hence across the wavelength range, a beam of 240 nm radiation may be swept across the grating 26 after it has been formed and the intensity of the beam varied so as to modulate the effectiveness of the grating in different parts of the grating. In this case, viewing FIG. 8, the effect will be that initially before the last beam of radiation is swept across the grating 26, the density of defects will follow the lines a,e,b,f,c,d,g,d but after the radiation has been swept across the grating 26, the density of defects will follow the line h,e,j,f,k,g,l. The shape of the graph will be the same as for the previous arrangement but with the relevant value shifted downwards in FIG. 8. Such an arrangement is shown in FIG. 9 in which there is provided a beam 27 of such radiation, and a moveable slit 28 is passed over the grating, the intensity of the beam being varied in accordance with a prearranged pattern as the slit 28 passes over the grating 26.

The above methods described with reference to FIGS. 7 and 8 show a "D-fibre". In practice, the same methods may be used with a simple circular fibre with core or indeed with a rectangular section semiconductor waveguide.

Figure 10:
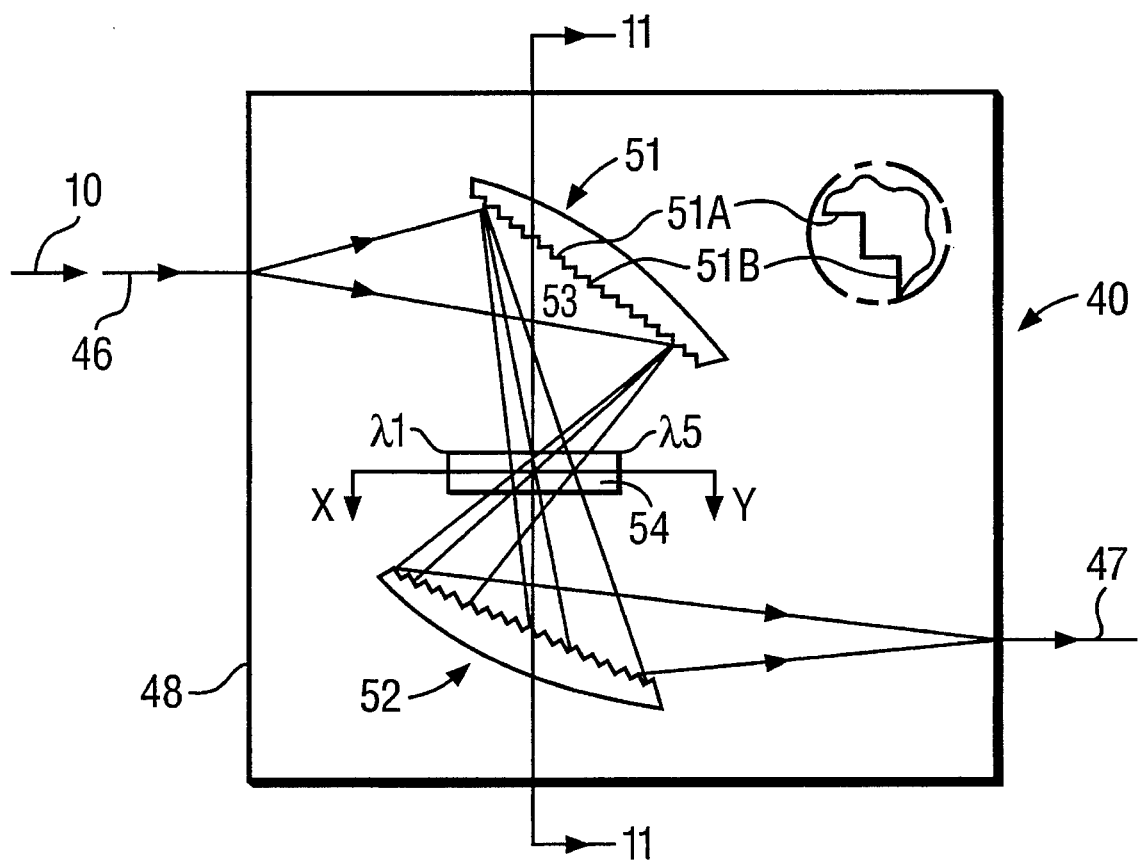
FIG. 10 is a diagrammatic view of a second type of filter of the invention.
Figure 11:
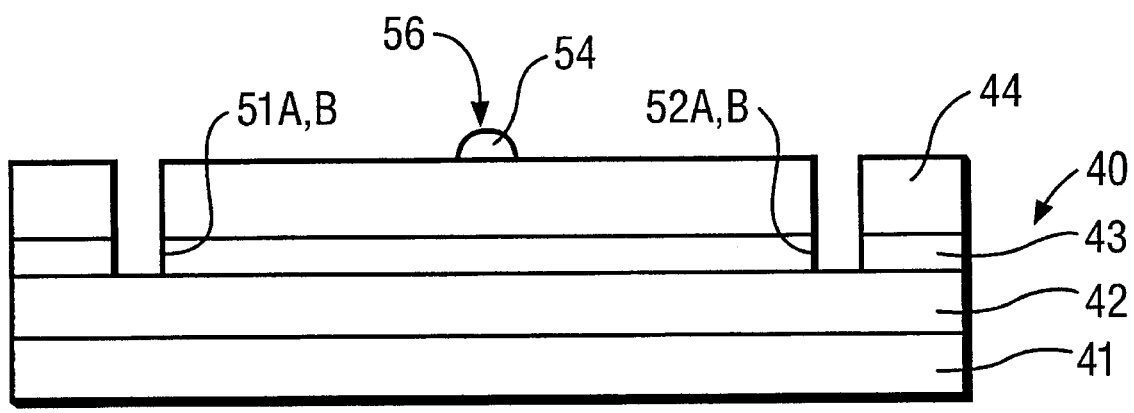
FIG. 11 is a cross section on line 11–11 of the filter of FIG. 10.

FIGS. 10 and 11 show an alternative embodiment of filter according to the invention.

A second embodiment of filter with a selected attenuation/wavelength characteristic will no be described with reference to FIGS. 10 and 11. Referring to FIG. 10 there is shown a planar waveguide 40 comprising a plurality of layers of material. As shown in FIG. 11, there is a base layer 41 of silicon, a layer 42 of silicon dioxide, a layer 43 of silicon dioxide and germanium dioxide $GeO_2$, and an upper layer 44 of silicon dioxide. In a sense, the layers 42 and 44 correspond to the outer cladding 10E of the arrangement of the earlier drawings, and the layer 43 corresponds to the core 10D.

The waveguide 40 is generally rectangular and there is provided an input port 46 and an output port 47 in the edge 48 of the waveguide 40. Opposite the input port 46 there is provided a first curved mirror grating 51, the mirror comprising a series of stepped mirrors 51A,B . . . as shown in exaggerated form in the circle in FIG. 10. In practice the mirror grating 51 is formed by etching the layer 43 in the region 53. A similar second curved mirror grating 52 is provided opposite the output port 47. A linear attenuation means 54 is provided between the gratings 51, 52. The form of this attenuation means 54 will be described later.

Referring to FIG. 10 it will be seen that the fibre 10 carrying a wavelength division multiplexed signal as before may be connected to the input port 45 and radiation is thereby transmitted through the layer 43 to the first mirror grating 51. The radiation is reflected from that first mirror grating 51 to the second mirror grating 52 and thence the output port 47. The mirror grating 51, however, causes interference and thereby provides a spatially-separated spectrum of the wavelengths of the incident radiation from $\lambda_1$ to $\lambda_5$ as illustrated along the length of the linear attenuation means 54. The mirror grating 52 recombines the spectrum into a single WDM output signal.

Effectively, therefore, the range R of wavelengths of interest are separated along the length of the linear attenuation means 54 and as will be apparent, by varying the attenuation effect of the linear attenuation means 54 along its length, we can provide a selected attenuation/wavelength characteristic.

Various linear attenuation means 54 may be provided. In a first arrangement, a slot may be cut or etched along the line X-Y to below the layer 43 and an attenuation filter inserted in the slot. The filter may be produced photographically, and the density of the filter may be varied along the line X-Y in accordance with a predetermined characteristic to provide the necessary selected attenuation/wavelength characteristic.

Alternatively, there may be provided over the line X-Y a layer of high refractive index material 56 (see FIG. 11) the width of which parallel to the surface of base layer 41 and orthogonal to X-Y may be varied so as to provide a variable effect on the transmission (and hence attenuation) of radiation across the line X-Y.

By varying the dimensions of the mirror grating 51 we select the range R of wavelengths which are to be separated along the length of the linear attenuation means 54, and by varying the attenuation characteristic of the linear attenuation means 54 in accordance with the wavelength of the spectrum passing that particular part of the attenuation means, we can vary the attenuation/wavelength characteristic so that, as with the preceding example, we can provide a filter having a wavelength/attenuation characteristic as shown in FIG. 5 which not only can eliminate or reduce the peaks A and B in the gain characteristic of the amplifier, but can also eliminate fine detail not shown.

FIGS. 6,7,10 and 11 show diagrammatically the apparatus of the invention. In practice there will also be provided isolators to reject radiation reflected back along the incident path or alternatively the grating(s) could be tilted off-axis to ensure that reflected beams do not couple back into the fibre.

Figure 12:
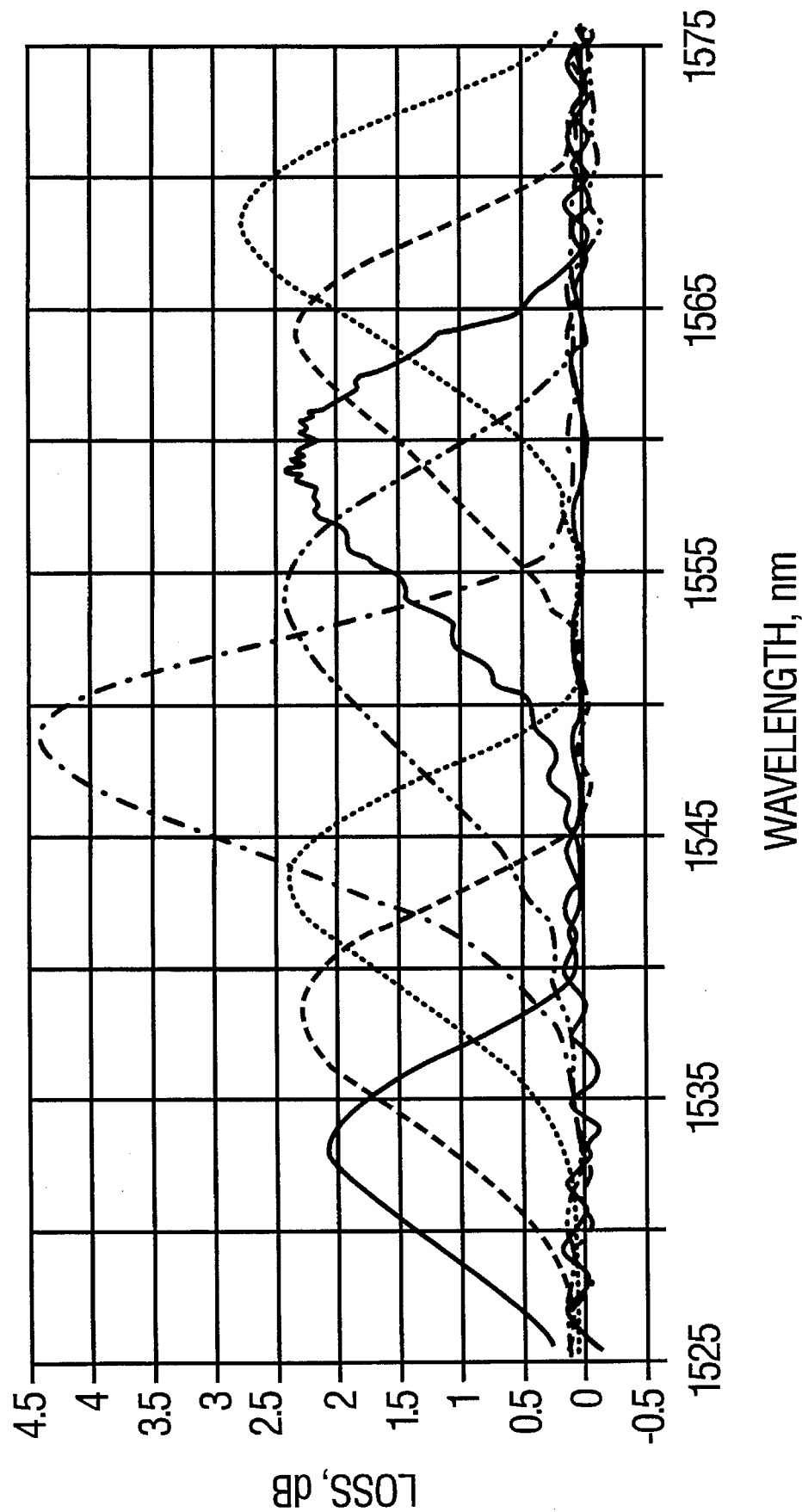
FIG. 12 shows, for a third type of filter of the invention, the measured transmission loss spectrum.

We will now describe a third filter of the invention. In principle, the third type of grating comprises a plurality of photosensitive side-tap gratings written directly into optical fibre by selection of the desired number of phase masks, each with a different pitch or period, to give a 5 nm wavelength separation in the written gratings. Thus along the length of the fibre, there are provided a succession of Bragg side-tap gratings. The gratings are written using intra-cavity frequency doubling in a BBO crystal of an argon laser, providing over 100 mW of 224 nm wavelength radiation. The central wavelengths of each side tap grating are defined by specially designed e-beam written transmission phase gratings together with a simple interferometer to recombine the beams. The diffracted beams pass through a rectilinear prism and are totally internally reflected to recombine at the fibre. Several phase gratings can be fabricated on a three inch ultra violet wavelength-transmitting silica substrate, with each grating period. defining a wavelength spaced by 5 nm from its near neighbours to thereby provide a set of grating periods which are spaced apart by 5 mm over a band of wavelengths from 1530 to 1570 nm. FIG. 12 shows the measured transmission loss spectrum of eight photosensitive side-tap gratings written directly on to the optical fibre by selection of eight phase masks each with a different period to give a 5 nm wavelength separation in the written gratings. The photosensitive gratings are then written in the manner described in R Kashyap, R Wyatt, R J Campbell, "Wideband gain flattened fibre amplifier using a photosensitive fibre blazed grating", Electronics Letters 29(2), 154–155, 21 Jan. 1993 and R Kashyap, J R Armitage, R J Campbell, D L Williams, G D Maxwell, B J Ainslie and C A Millar, "Light sensitive optical fibres and planar waveguides", BT Technology Journal 11(2) 150–160, 1993 (both of which are herein incorporated by reference) but with a slightly shallow angle of 6°. FIG. 12 shows the loss spectrum for eight gratings written into highly photosensitive fibre as before. The gratings were written in sequence and the peak loss for each grating was monitored in real time using an erbium fibre ASE source. The peak loss at 1548 nm of 4 dB was the result of writing two such gratings. From this Figure one can see that side-tap loss may be induced at will at the desired wavelengths. The widths and the central wavelength can be continuously adjusted by alignment with a fibre.

Figure 13:
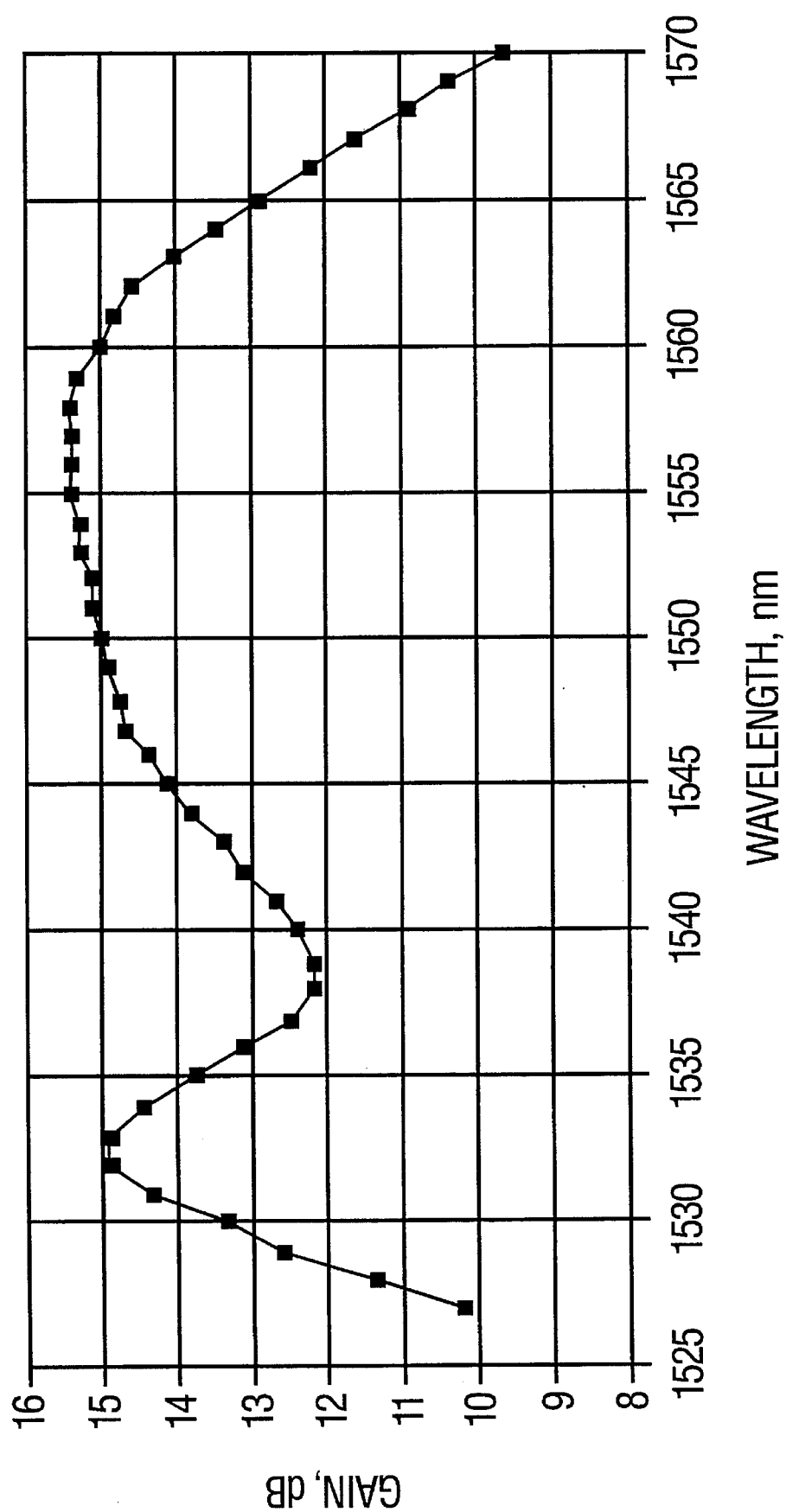
FIG. 13 shows the gain spectrum of the amplifier used in saturation before passage through the third type of filter of the invention.
Figure 14:
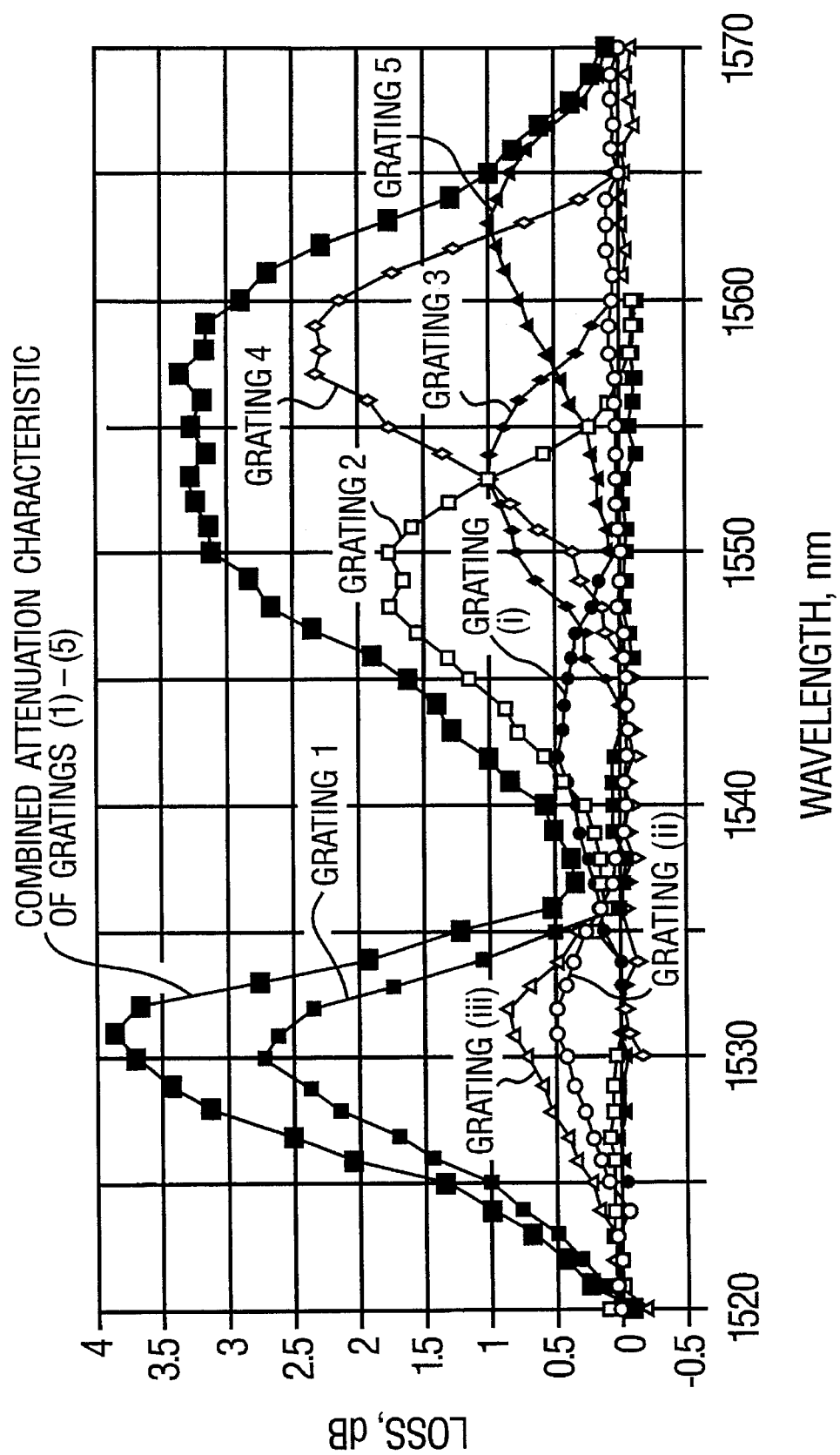
FIG. 14 shows the measured loss spectrum of individual parts of the filter as well as the composite response of all of the filters, and, FIG. 15 is the flattened gain spectrum of the amplifier after passing through the third type of filter.
Figure 15:
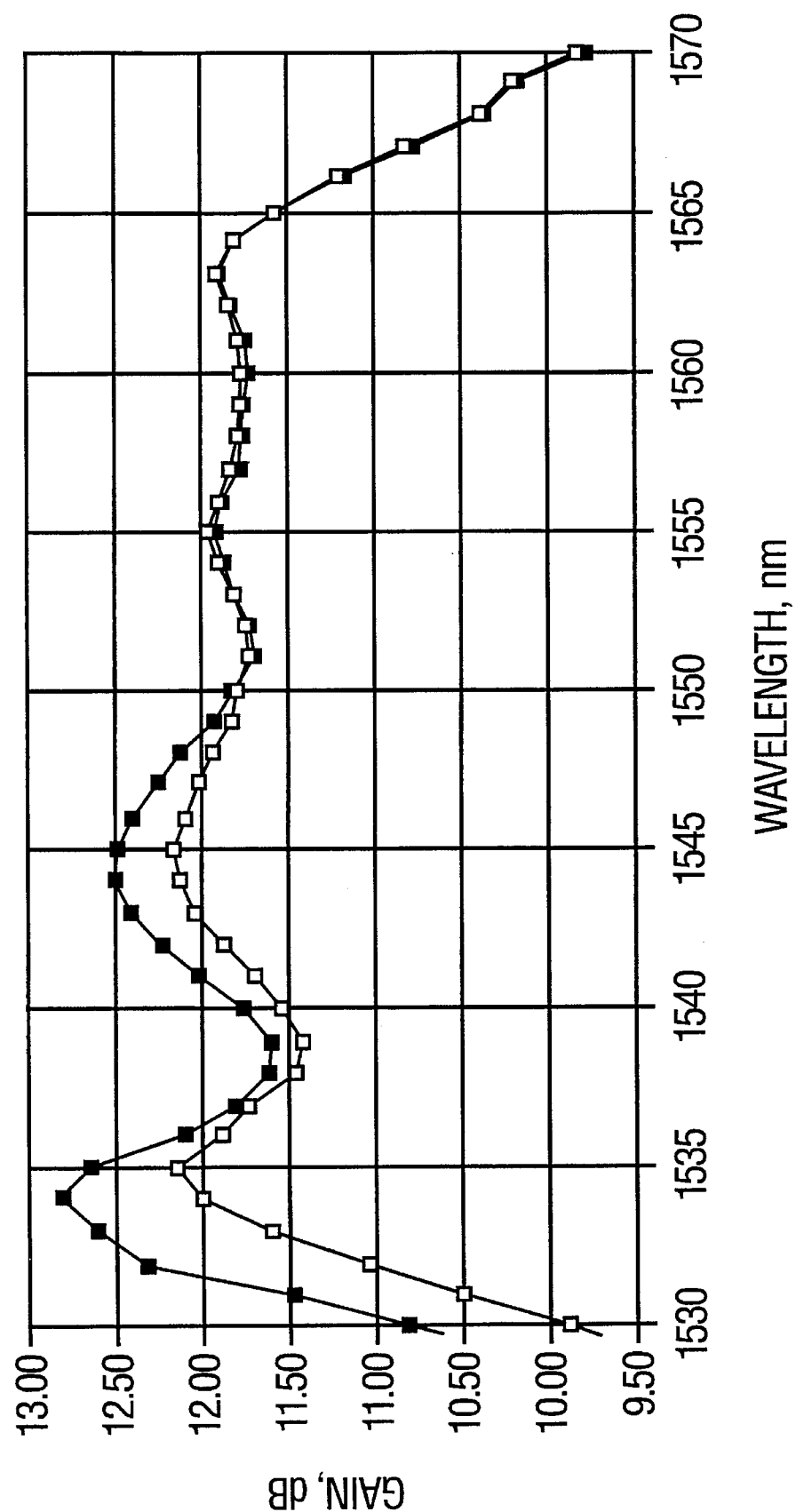

Firstly, the saturated gain of the 1480 nm diode pumped amplifier was measured under normal operating conditions. This is shown in FIG. 13 which shows the gain spectrum of the amplifier used in saturation before flattening. By suitably selecting gratings from the data set of FIG. 12, a design of the filter was established, providing the information on the peak loss and position of each grating. The required gratings were written into a 15 cm length of highly photosensitive fibre (as by the method described in D L Williams, B J Ainslie, J R Armitage, R Kashyap, R J Campbell, "Enhanced photosensitivity of boron doped optical fibres", Electronics Letters 229(1), 45, 1993, incorporated herein by reference) by preselecting the appropriate phase-mask. The cumulative loss of the gratings is shown immediately above individual filters (bottom trace) in FIG. 14. FIG. 14 shows the measured loss spectrum of individual fibres (bottom trace) written into the optical fibre following the requirements for the desired filters. (i), (ii) and (iii) are filters written after the amplifier was connected. The upper most trace shows the composite response of all the fibres when the required loss for all the gratings had been achieved using the amplifier in saturation. The flattened gain spectrum with the filter placed after the amplifier, is shown in FIG. 15 (bottom trace). FIG. 15 shows the flattened gain spectrum of the amplifier with the filter in-line (upper trace). The final spectrum (lower trace) was achieved after three further gratings (i), (ii) and (iii) were written. The two small peaks around that were written by writing three more gratings each with a peak loss of approximately 0.5 dB at 1544, 1531 and 1532 nm [also shown in FIG. 14 as (i), (ii) and (iii)]. The final spectrum is shown in FIG. 15 (top trace). This shows a flattened gain spectrum to within ±0.3 dB from 1532.5 nm to 1565 nm.

The overall filter gain when compared with the original amplifier spectrum shows a difference of 2.2 dB at the minimum gain point at 1537 nm. This difference would ideally be zero. 1.9 dB of loss is attributed to the two splices to the FC-PC connectors, owing to the mismatch between the fibres used for the filter and the Type "B" fibres in the connectors. The insertion loss incurred by the writing of the filter is therefore approximately 0.3 dB. This is due to the loss spectrum of the gratings and is a compromise between the degree of flattening of the spectrum and the loss incurred. There is no measurable loss due to broadband coupling to radiation modes. The output power in the saturated regime for the filtered amplifier was +7 dBm of the design input of −5 dBm. This loss of output power is due to the simple configuration of the experiment; an optimised amplifier would have the filter placed within the amplifying fibre. With careful splicing, the insertion loss should be little greater than the insertion loss of the filter.

It has been shown that photosensitive side-tap Bragg gratings may be used extremely effectively to equalise the gain spectrum of erbium doped power amplifiers to within ±0.3 dB over 33 nm with a 0.3 dB loss penalty. This scheme is also highly attractive in tailoring the transmission spectrum of a wide variety of devices compatible with optical fibre. Different shaped filters may be made by suitable choice of the peak loss wavelength of each grating. It has also been shown that it is easy to tap light out of the fibre at any desired wavelength using this non-invasive technique. The side-tapped power may be used for monitoring purposes or for non-invasive signal reception in a ring communication system.

It will be understood therefore, that by providing more than one grating at a particular chosen frequency, one can provide a filter which has a desired characteristic. In the arrangement shown in FIG. 12, the filter is clearly more effective at a wavelength of 1548 than at other wavelengths.

To design a suitable fibre to flatten the gain spectrum of an amplifier, the saturated gain of a 1480 nm diode pumped amplifier was measured under normal operating conditions. The spectrum is shown in FIG. 13. By suitably selecting gratings from the data set shown in FIG. 12, a design of filter can be established. The required gratings are written into a 15 cm length of highly photosensitive fibre by preselecting the appropriate phase masks. The cumulative loss of the gratings is shown.

In summary of the third embodiment of the invention and the arrangements of FIGS. 12 to 15, we may provide in an optical fibre a plurality of short lengths of side-tap Bragg gratings, each of the short lengths having an individual pitch distance which attenuates, along the fibre, radiation of a particular wavelength, the individual gratings having depletion densities either all the same density, or individually chosen densities to provide different degrees of attenuation, and for more attenuation of particular wavelengths, an individual grating may be of extended length or there may be provided more than one grating of a particular pitch.

In the arrangement shown in FIG. 12, there is shown the loss/wavelength characteristic of eight gratings, arranged to attenuate wavelengths spaced by 5 nm, and each having substantially the same depletion density so as to attenuate the radiation to the same extent, except that the grating with is arranged to attenuate at 1548 nm is either of twice the length of the other gratings, or two separate gratings are provided so that the loss at that wavelength is approximately double that at other wavelengths.

It will be clear from FIG. 12 that there is overlap in the attenuation characteristic of the separate gratings.

FIG. 13 shows the characteristic of an erbium doped amplifier which is to be smoothed and this done by using a number of gratings as set out in FIG. 14. Initially, five gratings are formed and their characteristics are illustrated as follows:

grating 1 (small solid squares) 2.7 dB loss centred 1530 nm, grating 2 (small open squares) 1.8 dB loss centred on 1549 nm, grating 3 (small solid diamonds) 1 dB loss centred 1553 nm, grating 4 (small open diamonds) 2.5 dB loss centred 1558 nm, and grating 5 (small solid triangles) 1 dB loss centred 1563 nm.

These five gratings provide a combined attenuation characteristic of the gratings (1) to (5) indicated by the trace indicated by the large solid squares.

Referring to FIG. 15, this last trace of large solid squares from FIG. 14 (the combined attenuation characteristic of gratings 1–5) is shown as the lower most trace (now illustrated by open squares) and the desired characteristic is shown by the higher trace, that is the trace with the solid square symbols. It is therefore necessary to "tweak" the characteristic. This can be done by providing three further gratings. Because we do not wish to attenuate the radiation too much, it is desired not to attenuate any further at the lower most point of the trace at 1538 nm and so we select three further gratings, as follows:

grating (i) (small solid circles) 0.5 dB centred at 1544 nm, grating (ii) (small open circles) 0.5 dB centred at 1531 nm, and grating (iii) (small open triangles) 1 dB centred at 1532 nm.

Therefore in a practical environment one may readily produce a filter which might be, for example, comprised of the gratings 1 to 5, and one can then fine tune the filter by providing variable, for each case, gratings (i), (ii), (iii).

We have found in practice that we can provide in a short length of optical fibre a side-tap Bragg grating which can reduce a gain variation of one plus or minus 1.6 dB over a bandwidth of 33 nm in a saturated erbium doped fibre amplifier to plus or minus 0.3 dB. The side-tap filters are of course non-reflective as is essential with the use of an erbium doped fibre amplifier.

The invention is not restricted to the details of the foregoing examples.

We claim:

1. An optical fibre amplifier having a selected gain spectrum comprising:

an optical amplifier having a gain spectrum over a range of wavelengths and a filter with a selected attenuation versus wavelength characteristic over said range of wavelengths in which the filter extends in a generally linear manner, the filter having a non-uniform physical structure therealong so that the wavelength of radiation which the filter attenuates varies continuously and non-uniformly from a first part of the filter which attenuates a first wavelength to a second part, spaced from the first part, which attenuates a second wavelength, the first and second wavelengths defining the range of wavelengths, the filter being arranged so that the degree of attenuation varies in a selected non-uniform manner from said first part to said second part to provide said attenuation versus wavelength characteristic, said attenuation versus wavelength characteristic being selected with respect to said gain spectrum of said optical amplifier to provide said selected gain spectrum of said optical fibre amplifier.

2. An optical fibre amplifier as in claim 1 wherein the filter is an interference filter, the dimensions of interference structure of said interference filter providing the interference and defining the wavelength varying in a continuous manner across the filter between said two parts, and attenuation means being spaced in a continuous manner across said filter to determine the proportion of radiation subject to interference at each point across filter.

3. An optical fibre amplifier as in claim 2 wherein said interference filter includes a grating, the pitch of which varies spatially.

4. An optical fibre amplifier as in claim 3 wherein the attenuation means to determine the proportion of the radiation subject to interference comprises a grating of spatially varying effectiveness.

5. An optical fibre amplifier as in claim 3 wherein the pitch of said grating is 0.4 to 0.7 µm, the spatial variation from said first part to the second part being 5%.

6. An optical fibre amplifier as in claim 3 wherein the pitch of said grating is substantially 0.53 µm, the spatial variation from said first part to the second part being 5%.

7. An optical fibre amplifier as in claim 2 wherein the attenuation means comprises an attenuation layer, the attenuation effect of the attenuation layer varying continuously spatially across the filter.

8. An optical fibre amplifier as in claim 2 wherein said filter includes:
   means to separate received radiation into a spatially disposed spectrum, and
   means to attenuate different parts of the spatially disposed spectrum in such a manner as to provide said selected attenuation versus wavelength characteristic.

9. An optical fibre amplifier as in claim 1 in which said optical amplifier comprises an erbium doped fibre amplifier.

10. A method for producing an optical fibre amplifier including a spectral filter having a selected gain spectrum over a range of wavelengths, said method comprising the steps of producing said filter by:
   passing to a radiation transmitting material with defect states two beams of radiation which change the density of defect states,
   said radiation being provided in the form of two beams which provide an interference pattern on said material,
   one of the beams being divergent or convergent with respect to the other beam to provide an interference grating pattern of density of defect states with spatially varying pitch, and
   further modifying the density pattern of defect states spatially across the interference pattern either as the interference pattern is produced or thereafter to provide a filter having an attenuation versus wavelength characteristic selected with respect to a gain spectrum of said optical amplifier without the filter to provide said selected gain spectrum for said optical fibre amplifier with said filter.

11. A method as in claim 10 in which the density pattern of defect states is modified as the interference pattern is provided by passing said beams to the material through a filtering medium of spatially varying attenuation property.

12. A method as in claim 10 wherein the pattern density of defect states is modified after the interference pattern is produced by passing a beam of said radiation of varying intensity across the interference pattern.

13. An optical fibre amplifier comprising:
   an optical amplifier having a gain spectrum over a range of wavelengths and filter with a selected attenuation versus wavelength characteristic,
   said filter comprising a plurality of different filter parts, each adapted to attenuate respective different wavelengths,
   each said different filter part having a respective attenuation characteristic to attenuate its respective wavelength to a predetermined extent, and
   means to combine the attenuated signal wavelengths from said different filter parts to provide a selected attenuation versus wavelength characteristic, said attenuation versus wavelength characteristic being chosen with respect to said gain spectrum of said optical amplifier to provide a selected gain spectrum for said optical fibre amplifier.

14. An optical fibre amplifier as in claim 13 wherein said wavelengths are of optical wavelength.

15. An optical fibre amplifier as in claim 13 wherein said different filter parts are spatially separated.

16. An optical fibre amplifier as in claim 13 wherein said different filter parts comprise a plurality of side-tap Bragg gratings in a length of optical fibre.

17. An optical fibre amplifier as in claim 13 wherein said filter is an interference filter, and in which said different filter parts comprise:
   separate grating means, the pitch of each said grating means being predefined, and
   at least some of said grating means having pitches differing from one another.

18. An optical fibre amplifier as in claim 17 wherein some of said grating means have the same pitch to increase the attenuation of radiation of that respective wavelengths.

19. An optical fibre amplifier as in claim 13 wherein the filter is an interference filter, said filter parts comprising:
   an interference filter means in which the dimensions of a means which defines the wavelength which is interfered varies in a continuous manner across the interference filter means to provide said filter parts, and
   attenuation means provided in a continuous manner across said filter to determine the proportion of radiation of the relevant wavelength subject to interference at each point across the interference filter means.

20. An optical fibre amplifier as in claim 19 wherein said interference filter means includes a grating, the pitch of which varies spatially.

21. An optical fibre amplifier as in claim 20 wherein the attenuation means comprises a grating of spatially varying effectiveness.

22. An optical fibre amplifier as in claim 20 wherein the pitch of said grating is 0.4 to 0.7 µm, the spatial variation across the grating being approximately 5%.

23. An optical fibre amplifier as in claim 20 wherein the pitch of said grating is approximately 0.53 µm, the spatial variation across the grating being approximately 5%.

24. An optical fibre amplifier as in claim 19 wherein the attenuation means comprises an attenuation layer, the attenuation effect of the attenuation layer varying continuously spatially across the filter.

25. An optical fibre amplifier as in claim 13 wherein said different filter parts includes:
   means to separate an input signal into a spatially disposed spectrum, and
   means to attenuate different parts of the spatially disposed spectrum so as to provide said amplitude versus wavelength characteristic.

26. An optical fibre amplifier as in claim 13 wherein said optical amplifier comprises an erbium doped fibre amplifier.

27. An optical fibre amplifier made by the process of claim 10.

28. A method for producing an optical filter having a selected attenuation spectrum, said method comprising the steps of:
   passing to a radiation transmitting material with defect states two beams of radiation which change the density of defect states,
   said radiation being provided in the form of two beams which provide an interference pattern on said material, one of the beams being divergent or convergent with respect to the other beam whereby to provide an interference grating pattern of density of defect states with spatially varying pitch, and
   further modifying the density pattern of defect states spatially across the interference pattern either as the interference pattern is produced or thereafter to provide a filter having an attenuation versus wavelength characteristic providing said selected attenuation spectrum.

29. An optical fibre amplifier having a selected gain spectrum comprising:
   an optical amplifier having a gain spectrum over a range of wavelengths and a filter made by the process of claim 28 with a selected attenuation versus wavelength characteristic over said range of wavelengths in which the filter extends in a generally linear manner, the filter being adapted so that the wavelength of radiation which the filter attenuates varies continuously from a first part of the filter which attenuates a first wavelength to a second part, spaced from the first part, which attenuates a second wavelength, the first and second wavelengths defining the range of wavelengths, the filter being arranged so that the degree of attenuation varies in a selected manner from said first part to said second part to provide said attenuation versus wavelength characteristic, said attenuation versus wavelength characteristic being selected with respect to said gain spectrum of said optical amplifier to provide said selected gain spectrum of said optical fibre amplifier.

30. A method of amplifying optical signals over a range R of wavelengths $\lambda_1-\lambda_n$ with a flattened signal gain over the spectral range R of amplified signals, said method comprising the steps of:

passing said optical signals through an optical fibre amplifier having plural peak amplification gain factors over said range R; and simultaneously also passing said signals through an optical attenuator having plural peak attenuation factors over said range R, said peak attenuation factors being approximately matched to said peak amplification factors over said range R to produce a composite amplifier output having a flattened signal gain over the spectral range R of amplified signals.

31. An optical signal amplifier for amplifying optical signals over a range R of wavelengths $\lambda_1-\lambda_n$ with a flattened signal gain over the spectral range R of amplified signals, said amplifier comprising:

an optical fibre amplifier having plural peak amplification factors over said range R; and an optical attenuator disposed within or in series with said optical fibre amplifier, said attenuator having plural peak attenuation factors over said range R, said peak attenuation factors being approximately matched to said peak amplification factors over said range R to produce a composite amplifier output having a flattened signal gain over the spectral range R of amplified signals.

* * * * *